United States Patent
Sait et al.

(10) Patent No.: US 12,026,449 B1
(45) Date of Patent: Jul. 2, 2024

(54) DOCUMENT STORAGE SYSTEM

(71) Applicant: KING FAISAL UNIVERSITY, Al-Ahsa (SA)

(72) Inventors: Abdul Rahaman Wahab Sait, Al-Ahsa (SA); Ibrahim Ali Albin Hamad, Al-Ahsa (SA); Yossef Ali Altriki, Al-Ahsa (SA)

(73) Assignee: KING FAISAL UNIVERSITY, Al-Ahsa (SA)

(*) Notice: Subject to any disclaimer, the term of this patent is extended or adjusted under 35 U.S.C. 154(b) by 0 days.

(21) Appl. No.: 18/405,538

(22) Filed: Jan. 5, 2024

(51) Int. Cl.
| | | |
|---|---|---|
| *G06F 40/12* | (2020.01) | |
| *G06K 7/14* | (2006.01) | |
| *H04L 25/02* | (2006.01) | |
| *H04R 25/00* | (2006.01) | |

(52) U.S. Cl.
CPC ........... *G06F 40/12* (2020.01); *G06K 7/1413* (2013.01); *G05B 2219/25255* (2013.01); *G05B 2219/41054* (2013.01); *H04L 25/0254* (2013.01); *H04Q 2213/343* (2013.01); *H04R 25/507* (2013.01)

(58) Field of Classification Search
CPC ........... G05B 2219/25255; G05B 2219/41054; H04L 25/0254; H04Q 2213/343; H04R 25/507; G06F 40/12; G06K 7/1413
See application file for complete search history.

(56) References Cited

U.S. PATENT DOCUMENTS

| | | |
|---|---|---|
| 11,611,615 B1 | 3/2023 | Long et al. |
| 2021/0027174 A1 | 1/2021 | Rubin |
| 2021/0241273 A1* | 8/2021 | Abad .................. H04L 9/3239 |
| 2021/0319020 A1* | 10/2021 | Walters ................ G06N 3/045 |
| 2022/0300711 A1* | 9/2022 | Elisco .................... G06N 3/08 |
| 2022/0348363 A1* | 11/2022 | Colson .................. B33Y 50/02 |
| 2023/0188542 A1 | 6/2023 | Nyamwange |
| 2023/0351167 A1 | 11/2023 | Fan et al. |

* cited by examiner

*Primary Examiner* — Azizul Choudhury
(74) *Attorney, Agent, or Firm* — Nath, Goldberg & Meyer; Richard C. Litman

(57) ABSTRACT

A document storage system includes a document digitizing device making an electronic copy of a document. A Liquid neural network (LNN) annotates the video files with document terms producing an annotated document. A semantic analyzer generates a relationship between document terms. A blockchain based data transaction forwards the annotated document to a server. A photonic spiking neural network (PSNN) server uploads and downloads annotated documents from the server. The interface will be changed automatically based on the individual's physical characteristics.

12 Claims, 2 Drawing Sheets

DOCUMENT STORAGE SYSTEM

BACKGROUND

1. Field

The present disclosure relates to a distributed document storage system, and particularly to a distributed document storage system based on Internet of Things (IOT) and deep neural networks (DNN).

2. Description of the Related Art

The use of electronic storage systems is ever increasing and the amount of information being stored is becoming hard to manage. Many use electronic folders and subfolders to store and manage the information being stored. This is an antiquated system and there may be better ways of storing and retrieving electronic information.

SUMMARY

An apparatus and method for distributed document storage uses a Liquid neural network (LNN), Internet of Things (IOT) elements, and a photonic spiking neural network (PSNN).

A document is initially scanned with a scanner and stored as an avi file. The scanned document is annotated using an LNN technique which is repeated until there is a minimum loss value. A semantic analyzer is used to generate a relationship between document terms. The avi files are then forwarded to a server using Blockchain technology. The PSNN is used to save and retrieve information from the server.

A document storage system, in one embodiment, includes a document digitizing device making an electronic copy of a document. A Liquid neural network (LNN) annotates the document with document terms producing an annotated document. A semantic analyzer generates a relationship between document terms. A blockchain based data transaction forwards the annotated document to a server. A photonic spiking neural network (PSNN) server uploads and downloads annotated documents from the server.

The document digitizing device is a scanner, in some embodiments, which saves the document in an avi video file.

The LNN extracts barcodes and keywords of the document as part of the annotation process.

Performance of the LNN is improved by introducing a small object detection strategy using a loss function.

The LNN performance is further improved by being iterated until a minimum loss value is generated.

A document storage method, in another embodiment, includes making an electronic copy of a document through a document digitizing device; annotating the document with document terms through a Liquid neural network (LNN) producing an annotated document; generating a relationship between document terms through a semantic analyzer; forwarding the annotated document to a server through a blockchain based data transaction; and uploading and downloading annotated documents from the server through a photonic spiking neural network (PSNN) server.

The document digitizing device in the method, in some embodiments, is a scanner, which saves documents as an avi video file.

The LNN extracts barcodes and keywords of the document as part of the annotation process.

Performance of the LNN is improved by introducing a small object detection strategy using a loss function.

The LNN performance is further improved by iterating until a minimum loss value is generated.

These and other features of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

An apparatus and method for a distributed document storage uses a Liquid neural network (LNN), Internet of Things (IOT) elements, and a photonic spiking neural network (PSNN). In contrast to traditional document storage, the novel distributed document storage system includes a document storage space, a scanner with LNN, an adaptive interface based on IoT devices and PSNN techniques.

When a user attempts to store a document, the document is collected through a scanner which scans the document and stores it as an avi file. The file is annotated using an LNN technique. During the annotation process, a barcode and keywords of the document are extracted. The performance of the LNN is improved by introducing a small object detection strategy with a loss function. The detection process is iterated until the technique generates a minimum loss value. In addition, a semantic analyzer is used to generate the relationship between each document term. The avi files are forwarded to the server using Blockchain technology. The annotated video files are used to retrieve the individual files based on a user query. As a result, no dedicated indexing process is required for the proposed system. The physical documents are stored into specific folders of the users.

An adaptive interface based on the user's physical characteristics using IoT devices is used to categorize the documents. Initially, the user's images and data are stored into the server. An IoT camera detects the user's face and an image reconstruction technique normalizes the faces and retrieves the physical characteristics of the users. In addition, a barcode is used to retrieve the user's physical characteristics from the server. Using this data, the interface is changed automatically based on the individual's physical characteristics.

Figure 1:
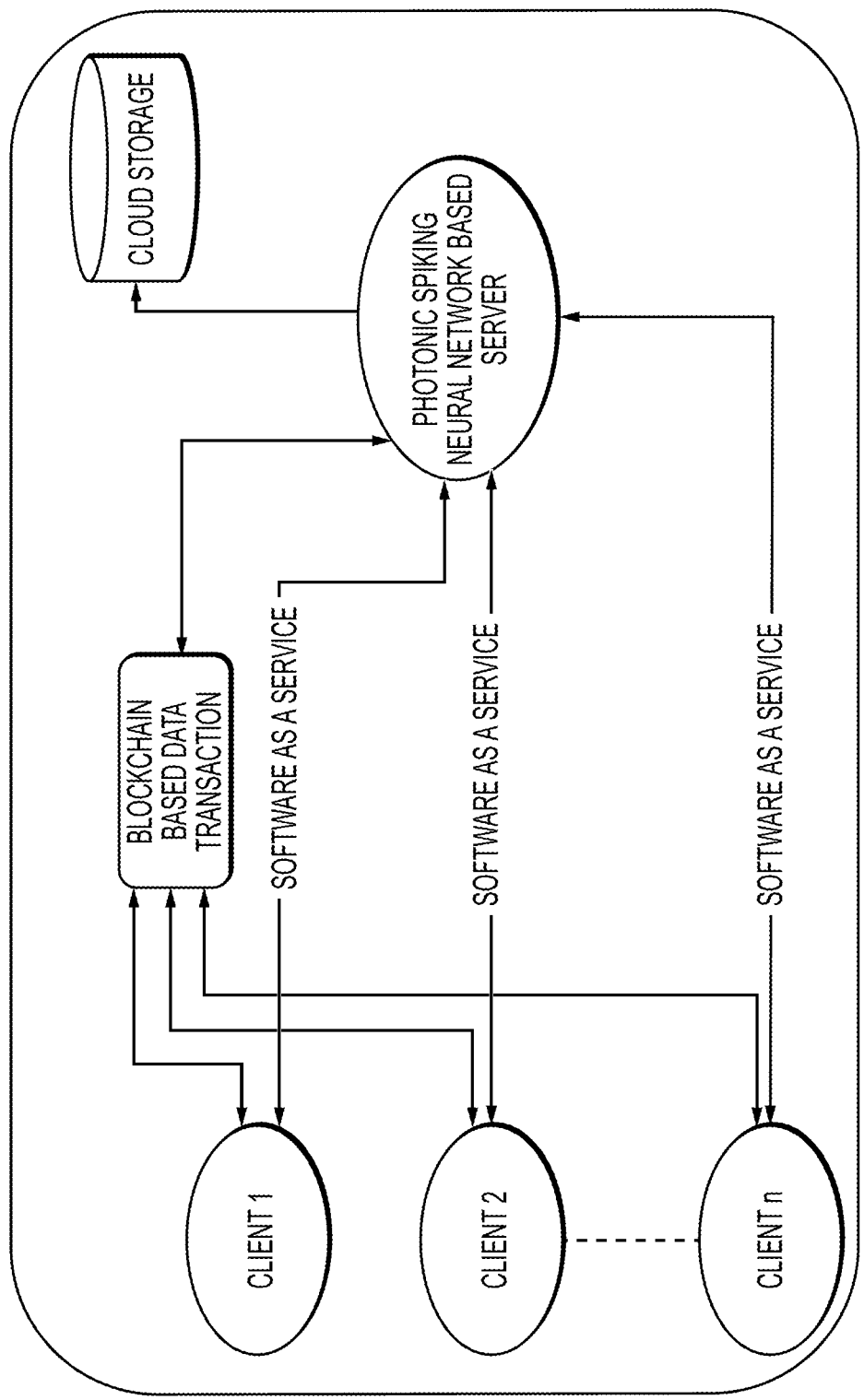
FIG. 1 is an illustration of multiple clients accessing data from a cloud based server.

Utilization of a PSNN minimizes the computational resources and allows the server to act as a base for each client device as shown FIG. 1. The software application is developed based on PSNN such that the server provides the software as a service to each client device. Quantization-aware training is applied to the system allowing for the operation of any software and hardware implementation type. Moreover, the PSNN is improved using quantization-aware training. In addition, the client device in this embodiment, uses 20×20 Sq. M for storing the physical documents. The server can demand additional space depending on the total number of users and documents per day. Based on the document storage policy, the physical document is transferred to a primary (server) storage center.

FIG. 1 is an illustration of multiple clients accessing data from a cloud based server. In this embodiment, the clients capture data, such as documents, using a scanner which saves the data as an avi video file.

A LNN is used to annotate the files in which barcodes and keywords are extracted. The LNN uses a small object detection strategy with a loss function which is iterated until the technique generates a minimum loss value. In addition, a semantic analyzer is used to generate the relationship between each document term.

Each of the clients (Client 1, Client 2 . . . Client n) forwards the annotated avi files to the cloud storage through a Blockchain based data transaction. A PSNN is used to minimize the computational resources and allows the server to act as a base for each client.

Downloading of files to each client from the cloud storage is also accomplished through the PSNN. A user sends a query through the PSNN to the cloud storage to retrieve a file.

Figure 2:
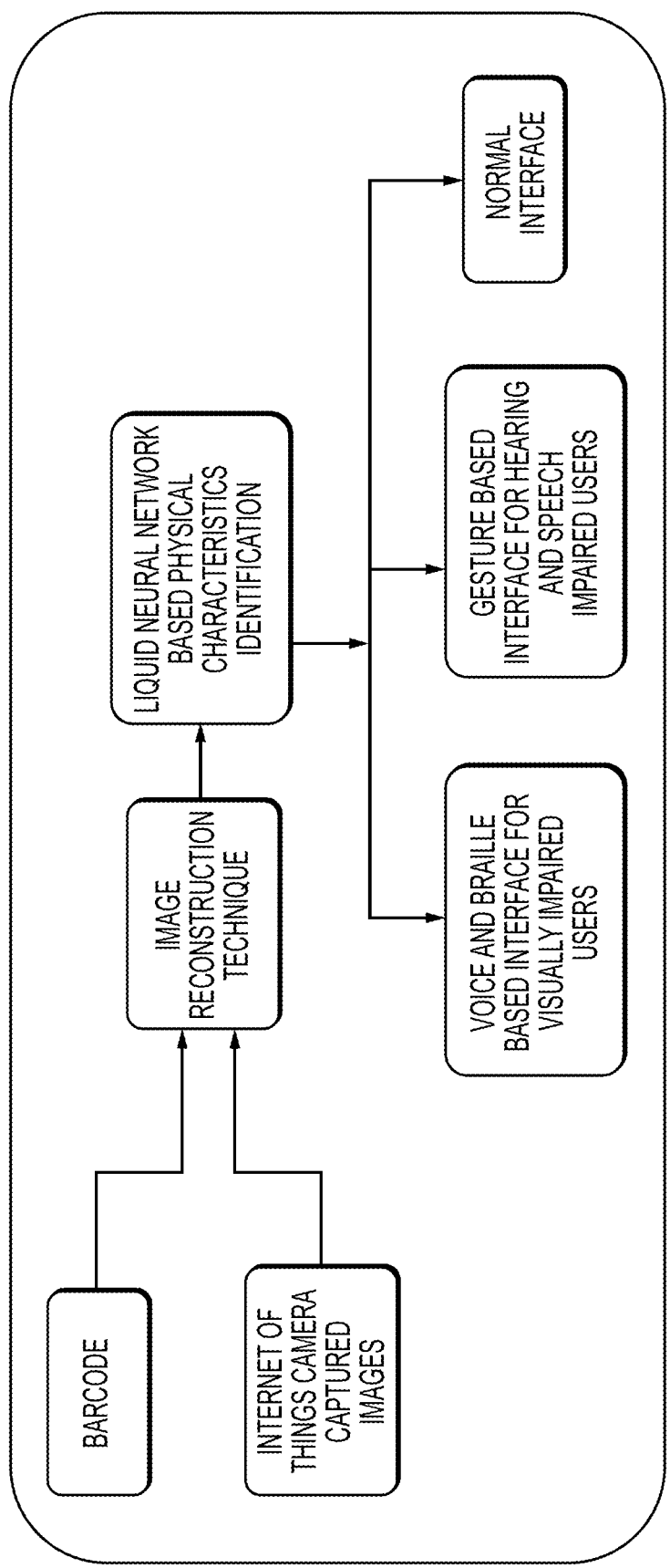
FIG. 2 is an adaptive interface used to categorize documents based on a user's physical characteristics using IoT devices and LNN.

FIG. 2 is an adaptive interface used to categorize documents based on a user's physical characteristics using IoT devices and LNN. A barcode is used to retrieve the user's physical characteristics from the server along with and IoT camera to capture a user's physical attributes. An image reconstruction technique is then performed and run through a LNN based physical characteristic identification. In this embodiment, there are three interfaces. One is a voice and Braille based interface for visually impaired users. There is a gesture based interface for hearing and speech impaired users. A normal interface is also provided for users without impairments.

The present subject matter is also directed to a document storage method utilizing the components set forth in the disclosed system. In a particular embodiment, the document storage method includes the steps of: making an electronic copy of a document through a document digitizing device; annotating the document with document terms through a Liquid neural network (LNN) producing an annotated document; generating a relationship between document terms through a semantic analyzer; forwarding the annotated document to a server through a blockchain based data transaction; and uploading and downloading annotated documents from the server through a photonic spiking neural network (PSNN) server. The various steps of the method are performed using the system components as described above.

It is to be understood that the present subject matter is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A document storage system, comprising:
   a document digitizing device making an electronic copy of a document;
   a Liquid neural network (LNN) annotating the document with document terms producing an annotated document;
   a semantic analyzer generating a relationship between document terms;
   a blockchain based data transaction forwarding the annotated document to a server; and
   a photonic spiking neural network (PSNN) server uploading and downloading annotated documents from the server.

2. The document storage system as recited in claim 1, wherein the document digitizing device is a scanner.

3. The document storage system as recited in claim 1, wherein the document is an avi video file.

4. The document storage system as recited in claim 1, wherein the LNN extracts barcodes and keywords of the document as part of the annotation process.

5. The document storage system as recited in claim 1, wherein a small object detection strategy using a loss function is introduced into the LNN.

6. The document storage system as recited in claim 5, wherein the LNN is iterated until a minimum loss value is generated.

7. A document storage method, comprising:
   making an electronic copy of a document through a document digitizing device;
   annotating the document with document terms through a Liquid neural network (LNN) producing an annotated document;
   generating a relationship between document terms through a semantic analyzer;
   forwarding the annotated document to a server through a blockchain based data transaction; and
   uploading and downloading annotated documents from the server through a photonic spiking neural network (PSNN) server.

8. The document storage method as recited in claim 7, wherein the document digitizing device is a scanner.

9. The document storage method as recited in claim 7, wherein the document is an avi video file.

10. The document storage method as recited in claim 7, wherein the LNN extracts barcodes and keywords of the document as part of the annotation process.

11. The document storage method as recited in claim 7, wherein a small object detection strategy using a loss function is introduced into the LNN.

12. The document storage method as recited in claim 11, wherein the LNN is iterated until a minimum loss value is generated.

* * * * *